Patented Feb. 3, 1942

2,272,122

UNITED STATES PATENT OFFICE 2,272,122

PROCESS FOR PRODUCING
HEXAHYDROPSEUDOIONONE

John Lee, Nutley, N. J.

No Drawing. Application October 5, 1940,
Serial No. 359,977

6 Claims. (Cl. 260—593)

The object of this invention is to provide a convenient and inexpensive method for the preparation of hexahydropseudoionone. This material is useful as a starting substance for the synthesis of phytol.

Hexahydropseudoionone has hitherto been prepared by the ketonic hydrolysis of ethyl tetrahydrogeranyl-acetoacetate by means of alcoholic potassium hydroxide. (Ishizaka, Berichte der Deutschen Chemischen Gesellschaft 47: 2455.) This synthesis is extremely involved and technically an unsatisfactory method.

I have now found that hexahydropseudoionone may be prepared by the catalytic hydrogenation of easily accessible pseudoionone using noble metal hydrogenating catalysts of the platinum group, such as palladium and platinum with hydrogen at super-atmospheric pressures and elevated temperatures. Under these conditions the fact that the production of hexahydropseudoionone should proceed so conveniently is surprising. The reduction of pseudoionone by means of noble metal catalysts has hitherto been attempted with formation, however, of only tetrahydropseudoionone. (Skita, Berichte der Deutschen Chemischen Gesellschaft 45: 3315.) I have found also that this tetrahydropseudoionone results when the catalytic reduction of pseudoionone is performed in the presence of nickel in a steel autoclave. If this reaction is forced by means of elevated temperatures and super-atmospheric pressures so as to obtain the absorption of the equivalent of three molecules of hydrogen, a carbinol is obtained which contains an unsaturated double bond rather than a saturated ketone.

It is therefore surprising to find that on using similar conditions and the noble metal hydrogenation catalysts that the reduction takes another course and produces a pure hexahydropseudoionone wherein all the double bonds are saturated and the keto group is maintained and no apparent carbinol formation occurs.

The reaction conditions may vary over a wide range. Hydrogen at pressures of 100 to 2500 lbs. pressure have been found to be usable, the higher pressures being advantageous in that the hydrogenation may be accomplished without the aid of external heating since the highly exothermic reaction of the saturation of the first two of the double bonds brings the reaction mixture to such a temperature that the hydrogenation of the third double bond proceeds with adequate rapidity. The temperature may be controlled by cooling the autoclave, if necessary, it being preferred to work below 200° C. since the catalyst tends to become less active at higher temperatures. If the hydrogenation does not run to completion without the application of external heat this may be applied, suitably heating the reaction chamber to 90° C. when absorption proceeds. Temperature conditions may vary with different catalysts, and even with different batches of the same type of catalyst, but preferably I work at 50–100° C.

I may use a solvent for the pseudoionone or operate without a solvent. Such solvents may be selected from the lower alcohols such as methanol and ethanol, ethers such as ether, dioxan, esters such as ethyl acetate, or indifferent solvents such as hydrocarbons.

The catalyst may be supported on a base, as for example carbon, calcium carbonate, barium sulfate, or may be used without such a support, as for example in the form of platinum (Adams catalyst, namely, platinum oxide, prepared according to Adams, Org. Syn. Coll. Vol., page 452, Wiley, 1932), platinum black, palladium black, and so on.

The following examples illustrate the invention without limiting the invention thereto:

Example 1

1173 gm. pseudoionone and 60 gm. palladinized carbon (prepared by reducing a suspension of carbon in palladium chloride solution by means of hydrogen) equivalent to 3 gm. palladium, are placed in a glass lined autoclave and hydrogenated by shaking at pressures ranging from 1250 to 500 lbs. The temperature of the reaction mass rises rapidly and if necessary the autoclave is cooled by running water over its outer surface and temporarily slowing up the speed of shaking, keeping the temperature around 90° C. When the temperature shows no inclination to rise above 90° C. cooling is stopped and the hydrogenation continued with shaking. Using technical pseudoionone, the absorption of hydrogen amounts to from 94% to 100% of hydrogen in a period of about two hours. When the hydrogenation is complete the apparatus is cooled, the catalyst filtered off, and the filtrate fractionated through a suitable column. In this manner 981 gm. colorless oil of slight odor, $N^{20}_D$ 1.435, iodine number 6, percentage ketone by hydroxylamine titration 99% is obtained.

Example 2

1173 gm. pseudoionone and 2 gm. Adams catalyst are placed in a glass lined autoclave and hydrogenated by shaking at pressures ranging from 1250 to 500 lbs. The product is worked up as in Example 1.

What I claim is:

1. Process for the manufacture of hexahydropseudoionone which comprises hydrogenating pseudoionone in the presence of a noble metal hydrogenation catalyst at a temperature of at least 50° C. and at a pressure substantially above atmospheric.

2. A process for the manufacture of hexahydropseudoionone which comprises hydrogenating pseudoionone in the presence of a noble metal hydrogenation catalyst at a temperature between 50° C. and 100° C. and at a pressure of at least 100 pounds.

3. Process for the manufacture of hexahydropseudoionone which comprises hydrogenating pseudoionone in the presence of a palladium-carbon catalyst at a temperature of at least 50° C. and at a pressure substantially above atmospheric.

4. Process for the manufacture of hexahydropseudoionone which comprises hydrogenating pseudoionone in the presence of a platinum catalyst at a temperature of at least 50° C. and at a pressure substantially above atmospheric.

5. Process for the manufacture of hexahydropseudoionone which comprises hydrogenating pseudoionone in the presence of a palladium-carbon catalyst at a temperature between 50° C. and 100° C. and a pressure ranging from 100 to 2500 lbs.

6. Process for the manufacture of hexahydropseudoionone which comprises hydrogenating pseudoionone in the presence of a platinum catalyst at a temperature between 50° C. and 100° C. and a pressure ranging from 100 to 2500 lbs.

JOHN LEE.